United States Patent [19]

Anderson

[11] 4,413,806
[45] Nov. 8, 1983

[54] SHUT-OFF VALVE ASSEMBLY

[76] Inventor: Glenys Anderson, 4820 Yorktown Lane North, Minneapolis, Minn. 55442

[21] Appl. No.: 288,063

[22] Filed: Jul. 29, 1981

[51] Int. Cl.³ .......................................... F61K 31/44
[52] U.S. Cl. ................................. 251/340; 251/267
[58] Field of Search ..................... 251/340, 266, 267

[56] References Cited

U.S. PATENT DOCUMENTS

| 495,064 | 4/1893 | Schrader | 251/340 |
|---|---|---|---|
| 544,752 | 8/1895 | Strater | 251/149 |
| 633,069 | 9/1899 | Busha | 251/340 |
| 841,322 | 1/1907 | Hoxie | 251/340 |
| 1,339,005 | 5/1920 | Speicher | 251/266 |
| 1,527,926 | 2/1925 | Schopen | 251/340 |
| 2,125,554 | 8/1938 | Franck | 251/8 |
| 2,300,483 | 11/1942 | Berger et al. | 251/149.2 |
| 2,893,421 | 7/1959 | Brown et al. | 251/267 |
| 3,606,096 | 9/1971 | Campbell | 222/153 |
| 3,881,448 | 5/1975 | Hallstrom | 119/14 |

Primary Examiner—A. Michael Chambers
Attorney, Agent, or Firm—Burd, Bartz & Gutenkauf

[57] ABSTRACT

A hydraulic fluid system having a fluid shut-off valve assembly for controlling the flow of fluid from a reservoir to a pump. The shut-off valve assembly has a body coupled to the drain pipe of the reservoir. The body has a chamber accommodating a valving member that is moved with a rotatable member between open and closed positions. An annular elastic ring yieldably retains the valving means in the open position. The valving means is a tubular member having a fluid outlet passage and a head attached to the tubular member. When the valving means is in the closed position, the head blocks the flow of fluid through the fluid outlet passage. A connector is attached to the rotatable member for coupling a fluid carrying hose to the valve assembly.

31 Claims, 10 Drawing Figures

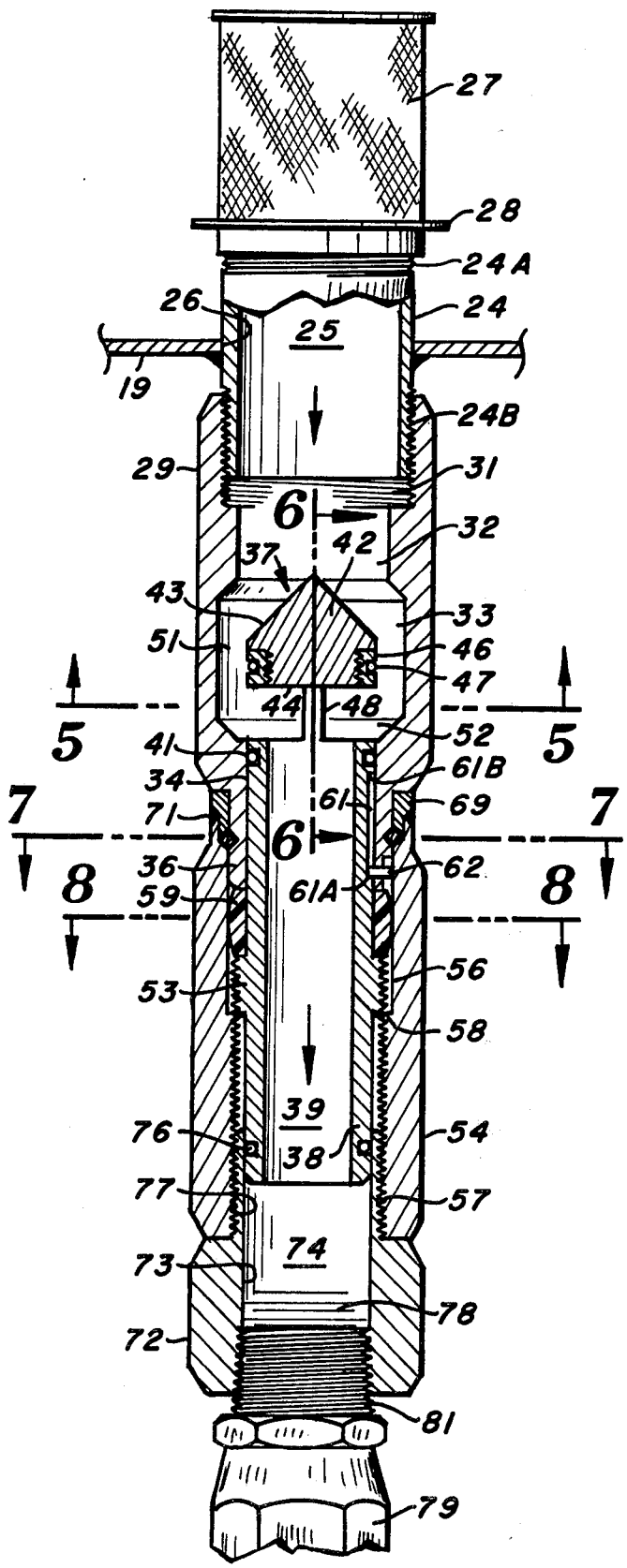
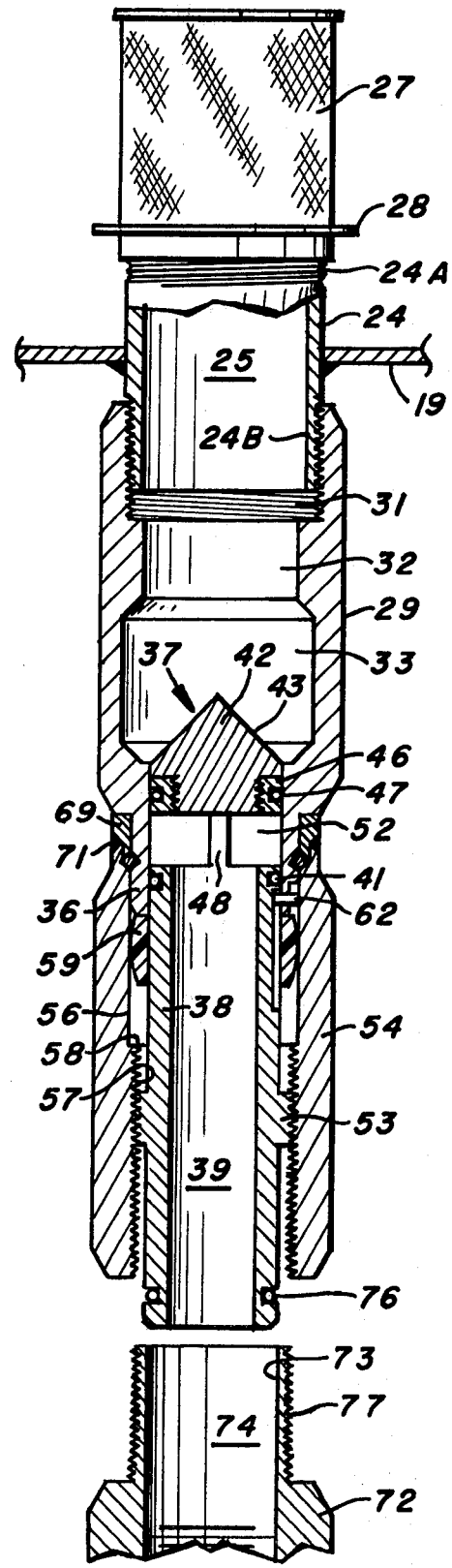
FIG.4
FIG.10

SHUT-OFF VALVE ASSEMBLY

SUMMARY OF THE INVENTION

The invention is directed to a valve assembly used in a hydraulic fluid system for blocking or shutting off the flow of hydraulic fluid in the system. Industrial and agricultural machinery and vehicles are provided with hydraulic fluid systems that include pumps, motors, and reservoirs coupled with valves and hydraulic lines to control the flow of hydraulic fluid. Periodically, the hydraulic fluid system must be inspected, serviced and repaired. This requires the decoupling of the fluid lines, inspection of the fluid motors and pumps and general servicing of the components of the hydraulic system. The hydraulic fluid in the system is normally drained into containers to prevent loss of the fluid. This fluid is replaced in the system after the maintenance of the motors and pumps and hydraulic lines have been replaced. The hydraulic fluid can be contaminated during the time that it is drained from the hydraulic system and replaced back into the hydraulic system. Also, considerable time and labor is required to drain the hydraulic fluid from the system and subsequently return the hydraulic fluid back to the system.

The hydraulic fluid systems of some machines do not utilize shut-off valves in the hydraulic line between the reservoir and the pump because of the high pressure drop across the valve. The high pressure drop can cause pump damage due to cavitation. In these hydraulic fluid systems the fluid is drained from the reservoir before the hydraulic line is disconnected therefrom. In hydraulic fluid systems that utilize shut-off valves, there is a possibility of human error in not opening the valves after the system has been serviced. In the event that the shut-off valve is not opened and the engine is started to operate the pump, hydraulic fluid will not be available and the pump will be damaged and possibly destroyed in a short period of time. Some shut-off valves have handles which must be locked to the fully open position. In the event that the handles are not securely locked, they can vibrate and move toward the closed position, thereby cutting off the flow of hydraulic fluid to the pump. This will also damage and eventually destroy the pump due to fluid starvation, which causes cavitation. The fluid shut-off valve assembly of the invention automatically assures the operator of the vehicle that the valve assembly in the hydraulic fluid line is fully open when the fluid line is connected to it and is fully closed when the fluid line is disconnected therefrom.

The valve assembly is operable to block the flow of fluid from the reservoir of the fluid system. The fluid remains in the reservoir so that no foreign matter can enter the fluid and contaminate the system. The fluid carrying line connecting the valve assembly with the pump can be disconnected from the valve assembly so that the pump can be serviced and removed from the machine. The valve assembly has a body having a chamber. The body is connected to the reservoir so that fluid from the reservoir flows into the chamber. The body has an inside wall providing a fluid outlet open to the chamber. A valving means is movably mounted on the inside wall for selectively opening and closing the fluid outlet to control the flow of fluid through the valve assembly. The valving means includes a tubular member having a fluid outlet passage open to the chamber when the valving means is in the open position and head means connected to the tubular member. The head means engages the inside wall when the valving means is in a closed position to block the flow of fluid through the fluid outlet passage. A member rotatably mounted on the body is manually operated to move the valving means to its open and closed positions. The member has a passage accommodating the valving means. Coacting means on the member and body are operable to move the valving means to its open and closed positions in response to rotation of the rotatable member. The valving means has limited longitudinal movement with respect to the body. Linear guide means prevent relative rotation between the valving means and the body so that on rotation of the rotatable member the coacting means operates to move the valving means between its open and closed positions. When the valving means has been moved to its open position, an annular elastic member surrounding the valving means is under compression to yieldably retain the valving means in the open position. The annular elastic means prevents the closing of the valving means due to mechanical vibrations and prevents the vibration of the valving means in the body. Connector means attaches a fluid carrying hose to the rotatable member. The connector means has an inside cylindrical wall and coacting means, such as threads, that cooperate with threads on the rotatable member to mount the connector means on the member. The valving means has a portion engageable with the inside cylindrical wall when the connector means is mounted on the rotatable member.

An object of the invention is to provide a shut-off valve assembly for use with a hydraulic system that has a valving member movable to an open position to allow free flow of fluid from a reservoir into a fluid line and movable from the open position to a closed position to block the flow of fluid from the reservoir to the fluid carrying line. A further object of the invention is to provide a shut-off valve assembly that is usable with existing hydraulic systems, as used in machinery and vehicles, that are operable to shut off the flow of fluid from a reservoir. A further object of the invention is to provide a shut-off valve assembly with a valving member that is retained in the open position with an annular elastic member and is moved from the open position to a closed position in response to rotation of a rotatable member. A further object of the invention is to provide a shut-off valve assembly with a valving member that is not affected by mechanical vibrations and will remain in the open position under normal operating conditions. These and other objects and advantages of the invention are embodied in the following description of a preferred embodiment of the valve assembly.

IN THE DRAWINGS

FIG. 4 is an enlarged sectional view taken along the line 4—4 of FIG. 2;

FIG. 10 is a sectional view similar to FIG. 4 showing the valving member in its closed position.

DESCRIPTION OF PREFERRED EMBODIMENT

Figure 1:
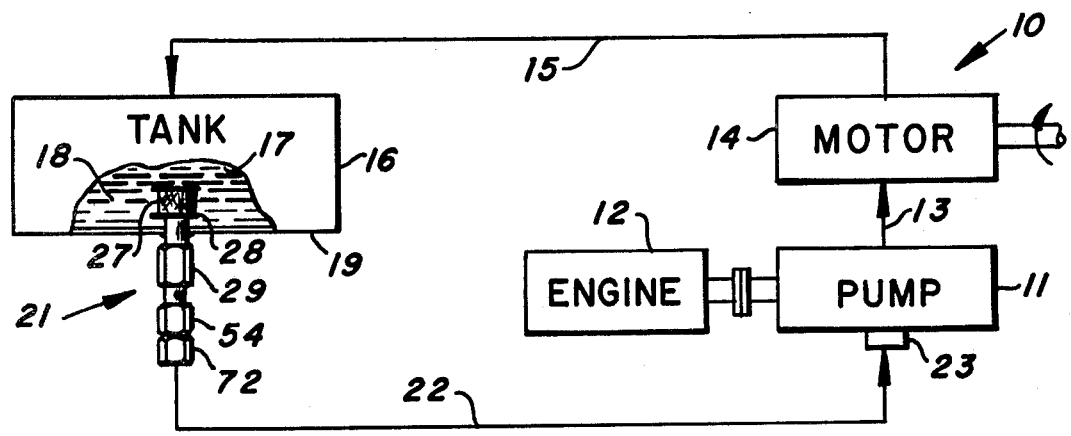
FIG. 1 is a diagrammatic view of a hydraulic fluid system equipped with a fluid shut-off valve assembly of the invention.

Referring to FIG. 1, there is shown a hydraulic fluid system, such as used to operate motors and cylinders that run industrial and agricultural machinery and vehicles. The hydraulic fluid system 10 has a pump 11 driven by an engine 12. Engine 12 can be an internal combustion engine or electric or air motor adapted to drive pump 11. The hydraulic fluid under pressure is carried by a line 13 to a receiver, such as a motor 14 or cylinder. Motor 14 can be a rotary hydraulic motor or a piston and cylinder motor. A fluid return line 15 carries the hydraulic fluid from motor 14 to a tank or reservoir 16. Reservoir 16 has a chamber 17 accommodating hydraulic fluid 18. Reservoir 16 has a generally flat bottom wall 19 connected to the fluid shut-off valve assembly of the invention indicated generally at 21. The lower end of shut-off valve assembly 21 is connected with a hose or pipe 22 to the suction port 23 of pump 11.

The hydraulic fluid system 10 requires periodic maintenance and inspection of pump 11 and motor 14 to insure proper operation. The hose 22 is disconnected from shut-off valve assembly 21 to facilitate the removal of pump 11 for inspection and servicing. Before hose 22 is disconnected from the shut-off valve assembly 21, the shut-off valve assembly 21 is operated to close the passage through the valve assembly to prevent the draining of fluid 18 from reservoir 16. Fluid 18 is stored in tank 16, free of external contaminants. After pump 11 has been serviced and installed in its operating location, hose 22 is connected to the shut-off valve assembly. The shut-off valve assembly 21 is then opened to permit the flow of hydraulic fluid 18 through hose 22 to suction port 23 of pump 11. The valve assembly 21 will remain open as it is not affected by mechanical vibrations that may be applied thereto.

Figure 2:
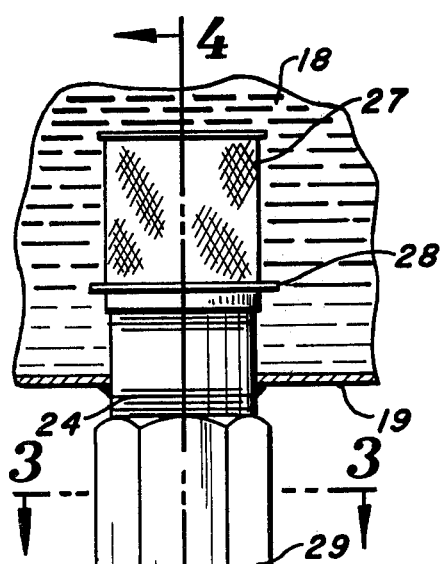
FIG. 2 is an enlarged side elevational view of the fluid shut-off valve assembly of FIG. 1.

Referring to FIGS. 2, 4 and 10, a short pipe or tubular member 24 having an upright passage 25 extends through a hole 26 in reservoir bottom wall 19. Pipe 24 is secured by welds or the like to bottom wall 19. The upper end 24A of pipe 24 is threaded and accommodates a cylindrical filter 27. The filter 27 has a cylindrical screen extended upwardly from an outwardly directed annular flange 28. The flange 28 functions as a barrier or shield to minimize the flow of sludge and particulates that settle on the bottom of reservoir chamber 17 into passage 25 of pipe 24.

Figure 3:
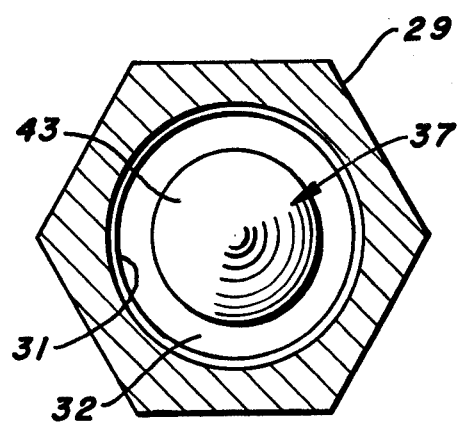
FIG. 3 is an enlarged sectional view taken along the line 3—3 of FIG. 2.
Figure 5:
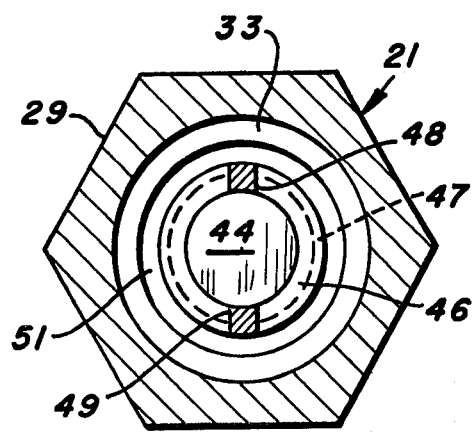
FIG. 5 is an enlarged sectional view taken along the line 5—5 of FIG. 4.

Fluid shut-off valve assembly 21 has an elongated tubular member or body 29. As shown in FIGS. 2, 3 and 5, the outside of the body has a hexagonal shape to accommodate a turning tool, such as a large wrench. Returning to FIG. 4, the upper portion or end of body 29 has a threaded opening 31 threaded onto the lower threaded end 24B of pipe 24. Body 29 has a passage 32 aligned with pipe passage 25 leading to a chamber 33. Chamber 33 is a cylindrical chamber having a diameter greater than the diameter of passage 32. The lower portion or end of body 29 has an inside cylindrical wall 34 extended downwardly from chamber 33.

A valving member indicated generally at 37 is slidably mounted on the inside cylindrical wall 34 and functions to selectively open and close the valve assembly. FIG. 4 shows valving member 37 in the open position wherein hydraulic fluid is free to flow through valve assembly 21 to suction hose 22. FIG. 10 shows the valve member 37 in a closed position blocking the flow of hydraulic fluid from reservoir 16 through valve assembly 21.

Valving member 37 has a sleeve or tubular member 38 having an upper cylindrical end slidably located in engagement with the inside cylindrical wall 34. Sleeve 38 has a longitudinal fluid outlet passage 39 for carrying hydraulic fluid from chamber 33 to hose 22. An O-ring or annular seal 41 located in a groove in the upper end of sleeve 38 engages cylindrical wall 34 and provides a sliding seal between sleeve 38 and wall 34.

Valving member 37 has a head 42 spaced upwardly from the top of sleeve 38. Head 42 has a cone-shaped upper or downstream end 43 and a flat opposite end 44 facing sleeve 38. Head 42 is threaded into a collar 46 secured to sleeve 38. Collar 46 has an outwardly open annular groove accommodating an O-ring 47. A pair of necks or strut members 48 connect the upper end of sleeve 38 to collar 46. Sleeve 38, collar 46 and strut members 48 are made from a one-piece metal tube. The head 42, collar 46, strut members 48 and tubular member 38 can be machined from one piece of metal. The head 42 and collar 46 have a diameter smaller than the diameter of chamber 33 whereby fluid can flow through an annular space or throat 51 into the entrance to the upper end of passage 39. Head end 44 is spaced from the upper end of sleeve 38 by necks 48 and 49 so that the liquid is free to flow through chamber 33 into passage 39. Collar 46 has a diameter that is substantially the same as the diameter of the inside wall 34 so that when the valving member 37 is in the closed position, as shown in FIG. 10, O-ring 47 will be located in sealing engagement with wall 34.

Sleeve 38 has an enlarged cylindrical rim 53 having external threads. A tubular member or nut 54 surrounds sleeve 38. Nut 54 has an upper cylindrical inside wall 56 having an upper end rotatably mounted on the cylindrical lower end section 36 of body 29 and a threaded inside wall 57 extended to the lower open end of nut 54. An annular shoulder 58 joins the lower end of cylindrical wall 56 with the upper end of the threaded inside wall 57. The threads on the enlarged rim 53 are adapted to cooperate with the threads on the inside wall 57 to linearly move the sleeve 38 in response to rotation of the nut 54.

Figure 8:
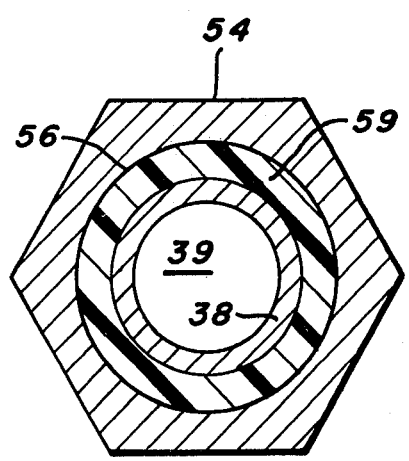
FIG. 8 is an enlarged sectional view taken along the line 8—8 of FIG. 7.
Figure 9:
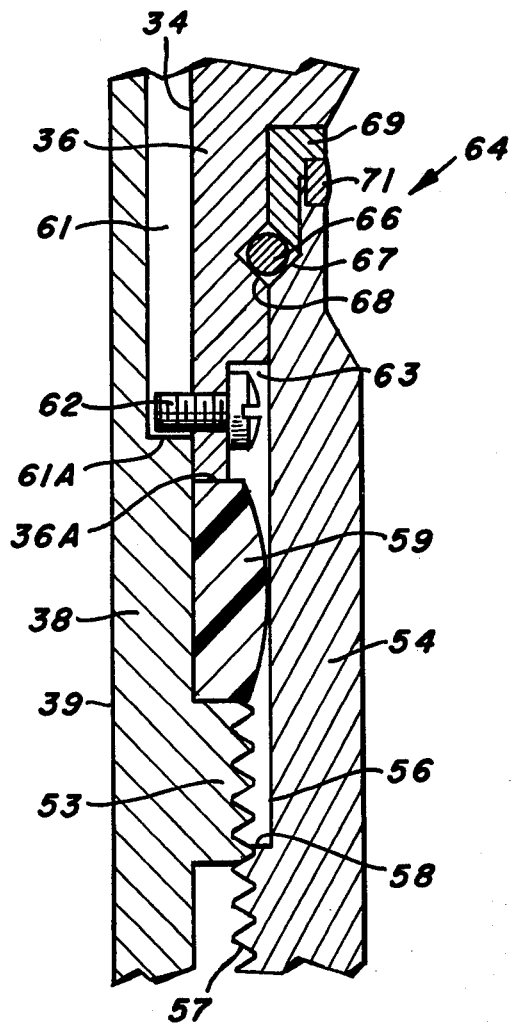
FIG. 9 is a sectional view taken along the line 9—9 of FIG. 7.

As shown in FIGS. 4, 8 and 9, an elastomer annular spring 59 is interposed between the lower end 36A of the section 36 and rim 53. Spring 59 is an annular sleeve of compressible plastic material that functions as an annular spring to maintain a longitudinal biasing force on sleeve 38. Spring 59 insures that rim 53 is in engagement with the shoulder 58 and holds valving member 38 in a stabilized position when it is open, as shown in FIG. 4. Spring 59 contacts wall 56 to prevent rotation of nut 54 due to mechanical vibrations.

Figure 6:
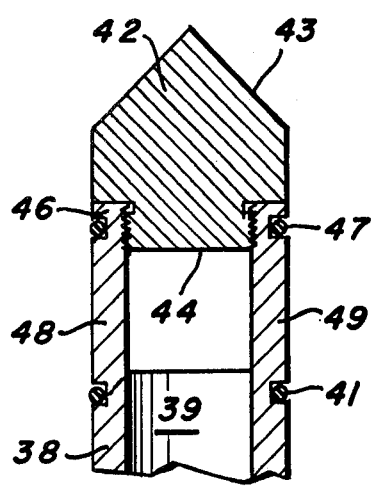
FIG. 6 is an enlarged sectional view taken along the line 6—6 of FIG. 4.
Figure 7:
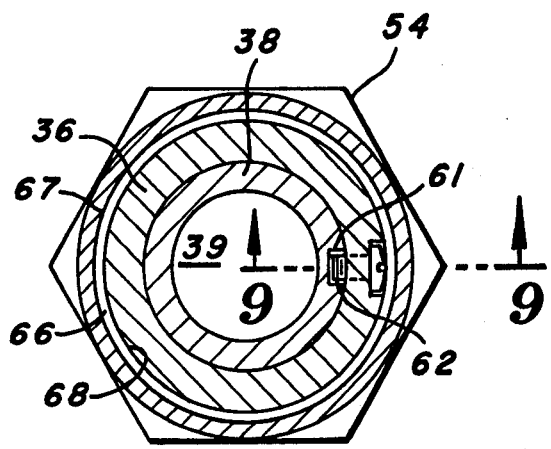
FIG. 7 is an enlarged sectional view taken along the line 7—7 of FIG. 4.

As shown in FIG. 9, spring 59, when compressed, creates reaction forces between end section 36 and enlarged rim section 53. This assures that the threads on rim section 53 will always be assured of re-engagement with the threads 57 on nut 54 when nut 54 is rotated to close the valve assembly. Without spring 59, the friction created by the annular seals 41 and 47, as shown in FIGS. 4, 6 and 10, and the annular seal 76 would not assure that the threads on rim 53 would engage the threads on nut 54 and thereby close the valving assembly 37.

Vibration of the valve assembly to the closed position is prevented when nut 54 abuts the coupling 72. Torque applied to nut 54 and coupling 72 creates a high friction between the engaging surfaces of the nut 54 and coupling 72. This high friction prevents the rotation of nut 54 relative to coupling 72 due to mechanical vibrations.

Spring 54 performs a further function of creating an audible "click" sound to signal that the valve assembly is fully open. The click sound is caused by the following sequence of events. When the valve assembly 37 is closed and coupling 72 disengaged, as shown in FIG. 10, coupling 72 is inserted onto the lower end of tubular member 38 to bring threads 72 into contact with the starting threads 57 of nut 54. Nut 54 is rotated, which causes threads on the coupling 72 to engage with the threads 57. This causes coupling 72 to move onto nut 54. Rotation of nut 54 also causes the tubular member 38 to move up thereby moving the valve to its open position, as shown in FIG. 4. The tubular member 38 will continue to move upwardly until the lower thread on the rim 53 rests on the upper thread of threads 57, or the last part of the imperfect thread 57. Continuous turning of the nut 54 will cause the threads on rims 53 and 57 to disengage. The reaction forces caused by the spring 59 that drives the rim section 53 into engagement with the threads 57 causes a "click" sound. The click sound is caused when thread on rim section 53 impacts and re-engages with the thread 57. The valve assembly has now signaled that it is fully open. A further one-half or more turn of nut 54 causes the coupling 72 to move into tight frictional engagement with the end of the nut 54, as shown in FIG. 4. High frictional engagement between the coupling 72 and nut 54 prevents the valve assembly from opening due to mechanical vibrations.

Sleeve 38 has an outwardly open linear groove 61 in the upper end section thereof. Groove 61 faces a linear portion of section 36. As shown in FIG. 9, a guide member 62, such as a bolt, pin, or key, mounted on body section 36, extends into groove 61. Guide member 62 is shown as a bolt having a head located in a recess 63 in section 36. The groove 61 has a lower end 61A and an upper end 61B.

As shown in FIG. 10, guide member 62 contacts the upper end 61B whereby the guide member 62 functions as a stop when the valving member 37 is in its fully closed position. The lower end 61A is located in a position so that it intentionally never contacts the guide member 62. When the valving member 37 is in the full open position, further opening of the valving member is prevented when threads 53 disengage the threads 57, as shown in FIG. 9.

Nut 54 is restrained against longitudinal movement by a retainer indicated generally at 64. The retainer 64 allows nut 54 to rotate on body section 36 in opposite directions whereby the valving member 37 can be selectively moved to open and closed positions. Retainer 64 comprises a metal ring 66 partially located in a groove 67 in the inside of nut 54, and a facing groove 68 in body section 36. An annular member 69 surrounds the body section 36 and is joined to the upper end of nut 54 with one or more removable keys 71. Other means, such as welds or the like, can be used to secure annular member 69 to nut 54. Annular member 69 allows the upper end of nut 54 to be placed over ring 66 so that nut 54 can be assembled onto body section 36 and ring 66 located in the grooves 67 and 68.

As shown in FIG. 4, a tubular nipple 72 is threaded into the lower end of nut 54. Nipple 72 has an inside cylindrical wall 73 forming a passage 74 in communication with the passage 39 of sleeve 38. The passage 74 leads to the passage in hose 22. The lower end of sleeve 38 has an O-ring 76 that engages the inside wall 73. O-ring 76 functions as a seal to prevent the flow of liquid through the external threads 77 which engage the threads in the lower end of nut 54. The nipple 73 has internal or female threads 78 accommodating the threads of a male threaded end 81 of a coupling 79. Coupling 79 is connected to and forms part of hose 22.

In use, valve member 37 is normally in the open position, as shown in FIG. 4. The hydraulic fluid, such as oil, is free to flow through valve assembly 21 into the suction hose 22 leading to the pump 11. Valve member 37 being in the open position has a minimum of interference with the flow of the hydraulic fluid through the chamber 33 and passage 39. The elastomer spring 59 being under compression biases and holds valving member 37 in the open position. Spring 59 also biases rim 53 into engagement with the shoulder 58 so that when nut 54 is turned the threads on rim 53 will cooperate with threads 57 on nut 34.

When the hydraulic system requires servicing or repair, valving member 37 is moved to its closed position to block the flow of hydraulic fluid through chamber 33 and fluid outlet passage 39. This is accomplished by rotating the nut 54 relative to body 29. A tool, such as a wrench, engages nut 54 and is used to rotate the nut. Rotation of nut 54 causes threads 57 to cooperate with the threads on rim 53. The pin 62 being located in the groove 61 in the tubular member 38 prevents the tubular member 38 from rotating, but allows the linear movement of tubular member 38 between its open and closed positions. The continued rotation of nut 54 causes tubular member 38 to move downwardly until head 42 is in engagement with a portion of cylindrical wall 34, as shown in FIG. 10. The head 42, along with seal 47, blocks the flow of fluid from chamber 33 into fluid outlet passage 39. When nut 54 is rotated, valve assembly 37 moves down to close the valve and coupling 72 unscrews from nut 54, as it is rigidly connected to coupling 79. The tubular member 38 moves down into the passage of coupling 72 so that fluid cannot flow from the coupling nor valve assembly during the time that the valving member 37 is moved from the open position, as shown in FIG. 4, to the closed position, as shown in FIG. 10. Once valving member 37 is in the closed position, coupling 72, which is rigidly connected to coupling 79 on hose 22, can be removed when its threads 77 disengage with threads 57 on nut 54. A cap (not shown) can be mounted on threaded end 72 to prevent the hydraulic fluid from flowing from hose 22. The pump 11, along with the motor 14, can be serviced and removed from the machine without draining the fluid from the reservoir 16 or contaminating the fluid in the reservoir 16 or hose 22.

After the servicing of pump 11 has been completed, hose 22 and coupling 72 rigidly attached to hose 22 is slipped onto the end of tubular member 38. The inside cylindrical wall 77 of coupling 72 engages the annular seal 76 to prevent leakage from the hose, as shown in FIG. 4. Threads 77 engage the threads 57 on the nut 54. As nut 54 is rotated, tubular member 39 moves up toward the open position, while coupling 72 simultaneously moves up at the same rate to the closed position. When the valve assembly is fully open, an audible click sound is heard. An additional half turn or more after the click causes the upper shoulder of coupling 72 to abut the lower end of nut 54. The engagement of coupling 72 with nut 54 generates friction to prevent the rotation of nut 54 under mechanical vibration, which could cause the valve assembly to move toward its closed position.

While there has been shown and described a preferred embodiment of the shut-off valve assembly of the invention, it is understood that changes in the structure, arrangement of structure, materials, size of the structure, and use of the structure can be made by one skilled in the art without departing from the invention. The invention is defined in the following claims.

The embodiments of the invention in which an exclusive property or privilege is claimed are defined as follows:

1. A shut-off valve assembly comprising: a body having a chamber, a first portion having a fluid inlet passage open to the chamber, and a second portion having an inside wall providing a fluid outlet opening to the chamber, valving means movably mounted on said inside wall for selectively opening and closing said fluid outlet, said valving means including a tubular member movably mounted on said inside wall, said tubular member having a fluid outlet passage open to the chamber when the valving means is in the open position, and head means connected to said tubular member and movable with said tubular member to an open position in said chamber and to a closed position in engagement with said inside wall to block the flow of fluid through said fluid outlet passage, means mounted on said second portion of the body operable to move the valving means to its open and closed positions, and annular elastic means engageable with said body and tubular member operable to hold the tubular member in the open position, said tubular body having an outwardly directed rim, and said annular elastic means being engageable with said rim and second portion of the body when the tubular member is in the open position.

2. The valve assembly of claim 1 including: means for attaching fluid carrying means to said means mounted on said second portion of the body.

3. The valve assembly of claim 1 wherein: said first portion of the body has an internal threaded section adapted to be threaded onto a member operable to direct fluid to said fluid inlet passage.

4. The valve assembly of claim 1 including: means spacing the head means from the tubular member.

5. The valve assembly of claim 4 wherein: the means spacing the head means from the tubular member comprise a plurality of neck members.

6. The valve assembly of claim 5 wherein: the head means includes a collar attached to the neck members, and a head mounted on the collar.

7. The valve assembly of claim 6 wherein: the tubular member, neck members, and collar are one-piece construction.

8. The valve assembly of claim 1 including: annular seal means on the tubular member and head means engageable with said inside wall of the second portion of the body.

9. The valve assembly of claim 1 including: means cooperating with said tubular member and body to prevent rotation of said tubular member relative to said body.

10. The valve assembly of claim 9 wherein: the means cooperating with said tubular member and body comprise a longitudinal groove in said tubular member, and projection means mounted on said second portion of the body extended into said groove.

11. The valve assembly of claim 9 wherein: the means mounted on said second portion of the body comprises a rotatable member having an internal threaded wall, means rotatably mounting the rotatable member on the second portion of the body, said tubular member having a threaded section cooperating with said internal threaded wall whereby rotation of the rotatable member moves the valving means to its open and closed positions.

12. A shut-off valve assembly comprising: a body having a chamber, a first portion having a fluid inlet passage open to the chamber, and a second portion having an inside wall providing a fluid outlet opening to the chamber; valving means movably mounted on said inside wall for selectively opening and closing said fluid outlet, said valving means including a tubular member movably mounted on said inside wall, said tubular member having a fluid outlet passage open to the chamber when the valving means is in the open position, and head means connected to said tubular member and movable with said tubular member to an open position in said chamber and to a closed position in engagement with said inside wall to block the flow of fluid through said fluid outlet passage, and means mounted on said second portion of the body operable to move the valving means to its open and closed positions, said means mounted on said second portion of the body comprises a rotatable member, said rotatable member having an opening accommodating said tubular member and a wall with internal threads, means rotatably mounting the rotatable member on the second portion of the body, means cooperating with said tubular member and body to prevent rotation of the tubular member relative to the body and allow longitudinal movement of the tubular member relative to said body, said tubular member having an outwardly projected annular rim, said rim having external threads cooperating with the internal threads whereby on rotation of the rotatable member in one direction the tubular member is moved to the open position and on rotation of the rotatable member in the opposite direction the tubular member is moved to the closed position, and annular elastic means surrounding said tubular member engageable with said rim and second portion of the body to bias the external threads into engagement with the internal threads when the tubular member is in the open position.

13. The valve assembly of claim 12 including: connector means for attaching a hose to the rotatable member, said connector means having external threads cooperating with the internal threads of the rotatable member, and an inside cylindrical wall, said tubular member having a portion engageable with said wall when the connector means is mounted on the rotatable member.

14. The valve assembly of claim 12 wherein: the head means has a generally cone shape on the upstream side thereof.

15. A shut-off valve assembly comprising: a body having a chamber, a first portion having a fluid inlet passage open to the chamber, and a second portion having an inside wall providing a fluid outlet open to the chamber, valving means having a tubular member movably mounted on said inside wall for selectively opening and closing said fluid outlet, means mounted on said body operable to move said valve means to its open and closed positions, and means for attaching fluid carrying means to said means mounted on said body, said means mounted on said body comprises a rotatable member, said rotatable member having an inside wall surrounding an opening accommodating said valving means, means rotatably mounting the rotatable member on the body, means cooperating with said rotatable member and body to prevent rotation of the tubular member relative to the body and allow longitudinal movement of the tubular member relative to said body, said tubular member having an outwardly projected annular rim, cooperating means on said rim and inside wall of the rotatable member operable on rotation of the rotatable member in one direction to move the valving means to its open position and operable on rotation of the rotatable member in the opposite direction to move the valving member to its closed position.

16. The valve assembly of claim 15 wherein: said first portion of the body has an internal threaded section adapted to be threaded onto a threaded member for delivering fluid to said valve assembly.

17. The valve assembly of claim 15 wherein: said valving means includes tubular means having a fluid outlet passage open to said chamber when the valving means is in the open position, and head means spaced from the tubular means, said head means being engageable with said inside wall when the valving means is in the closed position to block the flow of fluid through said fluid outlet passage.

18. The valve assembly of claim 17 including: means spacing the head means from the tubular means.

19. The valve assembly of claim 18 wherein: the head means includes a collar attached to the means spacing the head means from the tubular means, and a head mounted on the collar.

20. The avalve assembly of claim 15 wherein: the head means has a generally cone shape on the upstream side thereof.

21. The valve assembly of claim 15 wherein: the means cooperating with said valving means and body comprise a longitudinal groove in said valving means, and projection means mounted on said body extended into said groove.

22. The valve assembly of claim 15 wherein: said valving means includes tubular means having a passage open to said chamber when the valving means is in the open position, and head means spaced from the tubular means, said head means being engageable with said inside wall when the valving means is in the closed position to block the flow of fluid through said fluid outlet passage, said means for attaching fluid carrying means having an inside cylindrical wall, said tubular means being engageable with said inside cylindrical wall.

23. The valve assembly of claim 22 including: annular seal means cooperating with said tubular means and said inside wall of the second portion of the body and said inside cylindrical wall of the means for attaching fluid carrying means.

24. The valve assembly of claim 15 wherein: said cooperating means comprise thread means on the rotatable member and body.

25. The valve assembly of claim 15 wherein: said valving means includes tubular means having a fluid outlet passage open to said chamber when the valving means is in the open position, and head means spaced from the tubular means, said head means being engageable with said inside wall when the valving means is in the closed position to block the flow of fluid through said fluid outlet passage.

26. The valve assembly of claim 25 including: means spacing the head means from the tubular means.

27. The valve assembly of claim 15 wherein: the means cooperating with said valving means and body comprise a longitudinal groove in said valving means, and projection means mounted on said body extended into said groove.

28. The valve assembly of claim 15 including: annular elastic means engageable with said body and valving means operable to retain the valving means in the open position.

29. The valve assembly of claim 15 wherein: said valving means includes head means spaced from the tubular member, said head means being engageable with said inside wall when the valving means is in a closed position to block the flow of fluid through said fluid outlet passage, and annular elastic means engageable with said rim and body when the valving means is in the open position to bias the cooperating means into operative relationship when the valving means is in the open position.

30. The valve assembly of claim 15 including: annular elastic means surrounding said valving means and engageable with said rim and body to bias the cooperating means into engagement with each other when the valving means is in the open position.

31. The valve assembly of claim 30 wherein: said cooperating means comprise thread means on said rim and rotatable member.

* * * * *